United States Patent
Akiyama et al.

(10) Patent No.: US 7,971,016 B2
(45) Date of Patent: Jun. 28, 2011

(54) MICROCOMPUTER AND ELECTRICAL DEVICE HAVING THE SAME

(75) Inventors: Kazuhiko Akiyama, Fuji (JP); Takayuki Kambe, Mishima (JP); Harunobu Nukushina, Fuji (JP)

(73) Assignee: Toshiba Carrier Corporation, Tokyo (JP)

( * ) Notice: Subject to any disclaimer, the term of this patent is extended or adjusted under 35 U.S.C. 154(b) by 69 days.

(21) Appl. No.: 11/154,205

(22) Filed: Jun. 16, 2005

(65) Prior Publication Data
US 2005/0283578 A1 Dec. 22, 2005

(30) Foreign Application Priority Data
Jun. 18, 2004 (JP) .................. 2004-181416

(51) Int. Cl.
*G06F 12/00* (2006.01)
*G06F 13/00* (2006.01)

(52) U.S. Cl. ............. 711/163; 711/100; 711/154; 711/1

(58) Field of Classification Search ............. 711/163, 711/100, 154
See application file for complete search history.

(56) References Cited

U.S. PATENT DOCUMENTS
6,715,049 B1 * 3/2004 Hayakashi .................. 711/163

FOREIGN PATENT DOCUMENTS
| JP | 11-110294 | 4/1999 |
| JP | 2004-5679 | 1/2004 |
| JP | 2004-118637 | 4/2004 |

OTHER PUBLICATIONS

Jeff Duntemann, "Assembly Language Step-by-Step", 2000, John Wiley & Sons, Inc., 2nd Edition, pp. 88-90, 189-191, & 269-276.*

* cited by examiner

*Primary Examiner* — Tuan V. Thai
(74) *Attorney, Agent, or Firm* — DLA Piper LLP (US)

(57) ABSTRACT

A ROM is divided into a first area and a second area. A program is stored in the second area and a jump command to the stored program is stored in a specific address of the second area. A call command for the specific address of the second area is stored in the first area.

6 Claims, 3 Drawing Sheets

MICROCOMPUTER AND ELECTRICAL DEVICE HAVING THE SAME

CROSS-REFERENCE TO RELATED APPLICATIONS

This application is based upon and claims the benefit of priority from prior Japanese Patent Application No. 2004-181416, filed Jun. 18, 2004, the entire contents of which are incorporated herein by reference.

BACKGROUND OF THE INVENTION

1. Field of the Invention

The present invention relates to a microcomputer having a storage means that is divided into a plurality of storage areas, and an electrical device having the same.

2. Description of the Related Art

Various prior art electrical devices have a microcomputer and operate by programs stored in a storage unit of the microcomputer, such as a read only memory (ROM). The control system of the microcomputer includes a unit for determining and performing the entire control operation of a device loaded with the microcomputer and a driver unit for controlling various actuators of the device in accordance with the contents of the determined operation. If the actuators are a simple relay and switch, the driver unit can easily be configured. In order to drive, e.g., a DC motor having a large capacity, however, a great load is applied to the driver unit and large programs are required for doing so.

For example, an air conditioning system includes a device control microcomputer (control MCU) for determining the number of revolutions of a motor and a motor drive microcomputer (drive MCU) for driving the motor in accordance with the contents of operations determined by the control MCU. These microcomputers are each formed of a single chip. The chip includes a ROM for storing programs and data, a RAM for temporarily storing data and a CPU for executing the programs and processing the data.

The ROM of the motor drive microcomputer stores programs in which algorithm necessary for driving the motor is described. The ROM of the device control microcomputer stores programs necessary for controlling the device. These microcomputers are connected to each other via a communication line. The device control microcomputer gives an instruction on the number of revolutions of the motor to the motor drive microcomputer. The motor drive microcomputer transmits data of the actual number of revolutions of the motor to the device control microcomputer.

In the foregoing system, instructions and responses are simply communicated between the microcomputers in accordance with a communication protocol. The programs stored in the ROMs of the microcomputers are executed only in their respective microcomputers. In other words, one of the microcomputers cannot gain access to the ROM of the other microcomputer. The contents of the programs of the microcomputers are not revealed to each other but protected confidentially. However, this system requires two microcomputers and thus increases in size.

If one microcomputer can both drive a motor and control a device, various merits such as device downsizing and cost reduction can be obtained. It can thus be thought to use one microcomputer whose ROM stores both programs for driving a motor and controlling a device. However, there occurs a problem that access can be gained to all the programs stored in the ROM. Even though a motor drive program and a device control program are created by different companies, the programs each can be read out of both the companies and thus cannot be protected confidentially from each other.

On the other hand, there is a microcomputer having a CPU and an external device one of which selectively has priority regarding the bus right of a data bus and an address bus of a memory. When the external device has the bus right, the memory can include an inhibit area (address) for inhibiting the external device from reading data out of the memory and writing data thereto (see, for example, Jpn. Pat. Appln. KOKAI Publication No. 11-110294). When the external device has the bus right, no access can be gained to a specific area in the memory to inhibit data from being read or written. Thus, the external device is inhibited from reading data out of the specific area, thereby ensuring the confidentiality of data and programs.

In the microcomputer that is so configured that the external device has the bus right, the external device can be inhibited from gaining access to the memory of the microcomputer. However, it is not taken into consideration how the confidentiality of programs stored in the memory is secured.

It can thus be thought to use a microcomputer with a memory that is divided into a plurality of storage areas. The microcomputer has a function of inhibiting data from being read out of the storage areas in response to access between them. With this microcomputer, a program created by a programmer of a company and then stored in a given storage area of a ROM cannot be read out by that of another company who creates a program to be stored in another storage area of the ROM. The confidentiality of the programs stored in the same ROM can thus be protected from each other.

In a microcomputer as described above, however, in order to execute a program stored in a given storage area of a memory and a program stored in another storage area thereof in association with each other, the address of each of the programs (the address in which an instruction to be executed first is stored) has to be made open to the programmers of both the programs in advance. More specifically, when a first program created by one programmer invokes a second program created by another programmer, an address necessary for invoking the second program can be designated and called. However, when a plurality of functions are created in the second program as different subroutines, the programmer of the first program has to be notified of the initial address of each of the subroutines in advance.

When the first and second programs are created at the same time, the initial address of each of the subroutines in the second program may change to a new address. If the address changes to a new address, the programmer of the first program has to be notified of the change. The programmer of the first program has to change an address to be called in the first program whenever the programmer of the second program changes the initial address of a subroutine. He or she therefore has to perform a complicated operation. If the programmer forgets to change an address to be called, there is a possibility that abnormal control will be performed.

BRIEF SUMMARY OF THE INVENTION

The present invention has been developed in consideration of the above situation and an object of one embodiment of the present invention is to provide a microcomputer capable of creating error-free programs properly and quickly while reducing the burdens on a plurality of programmers with no contact between the programmers.

According to an aspect of the present invention, there is provided a microcomputer including a storage unit that is divided into a plurality of storage areas, the microcomputer having a function of causing one of the storage areas to inhibit data from being read out of another one of the storage areas, wherein at least one program is stored in the another one of the storage areas, a jump command to the stored program is stored in a specific address of the another one of the storage areas, and a call command for the specific address is stored in the one of the storage areas.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described below with reference to the accompanying drawings.

Figure 1:
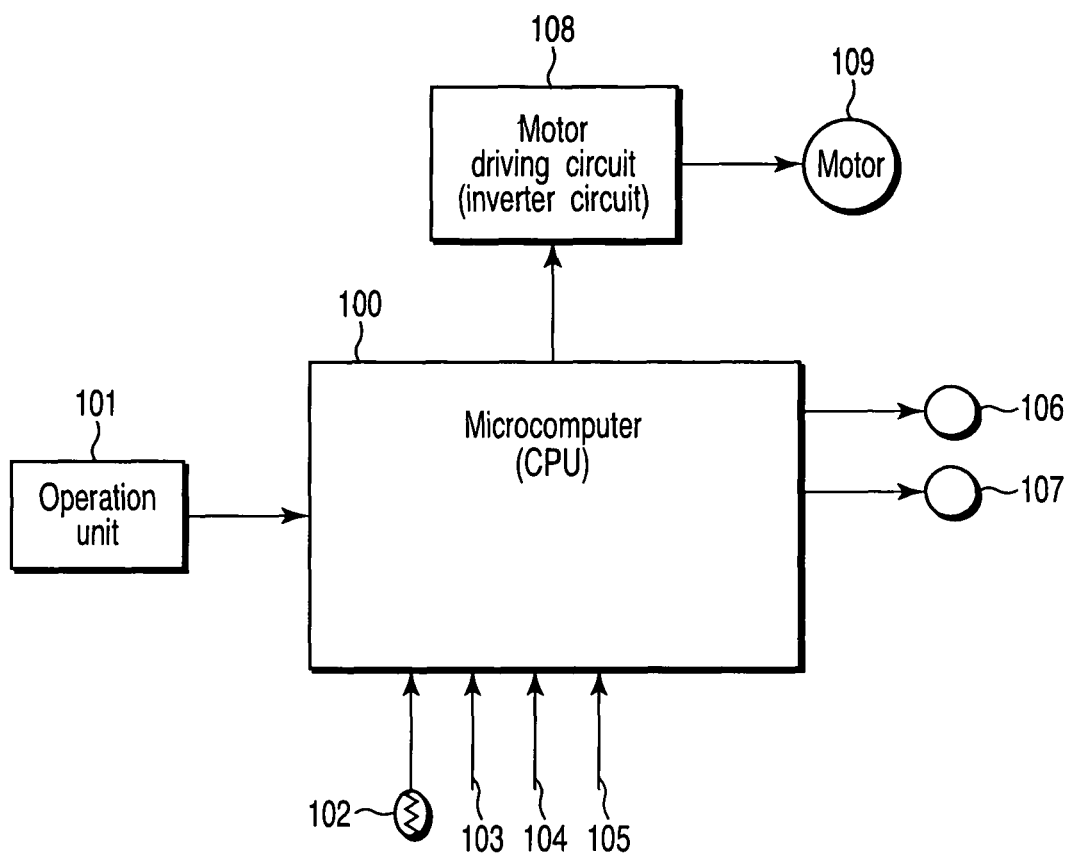
FIG. 1 is a block diagram showing a configuration of an electrical device according to an embodiment of the present invention.

FIG. 1 shows a configuration of the principal part of an electrical device such as an air conditioner.

In FIG. 1, reference numeral 100 indicates a microcomputer that controls the operations of the air conditioner. An operation unit 101, a temperature sensor 102, signal lines 103, 104 and 105 for inputting various data items, actuators 106 and 107 for controlling various operations and a motor driving circuit 108 are connected to the microcomputer 100. The motor driving circuit 108, which is, for example, an inverter circuit, outputs driving power to a compressor motor 109.

Figure 2:
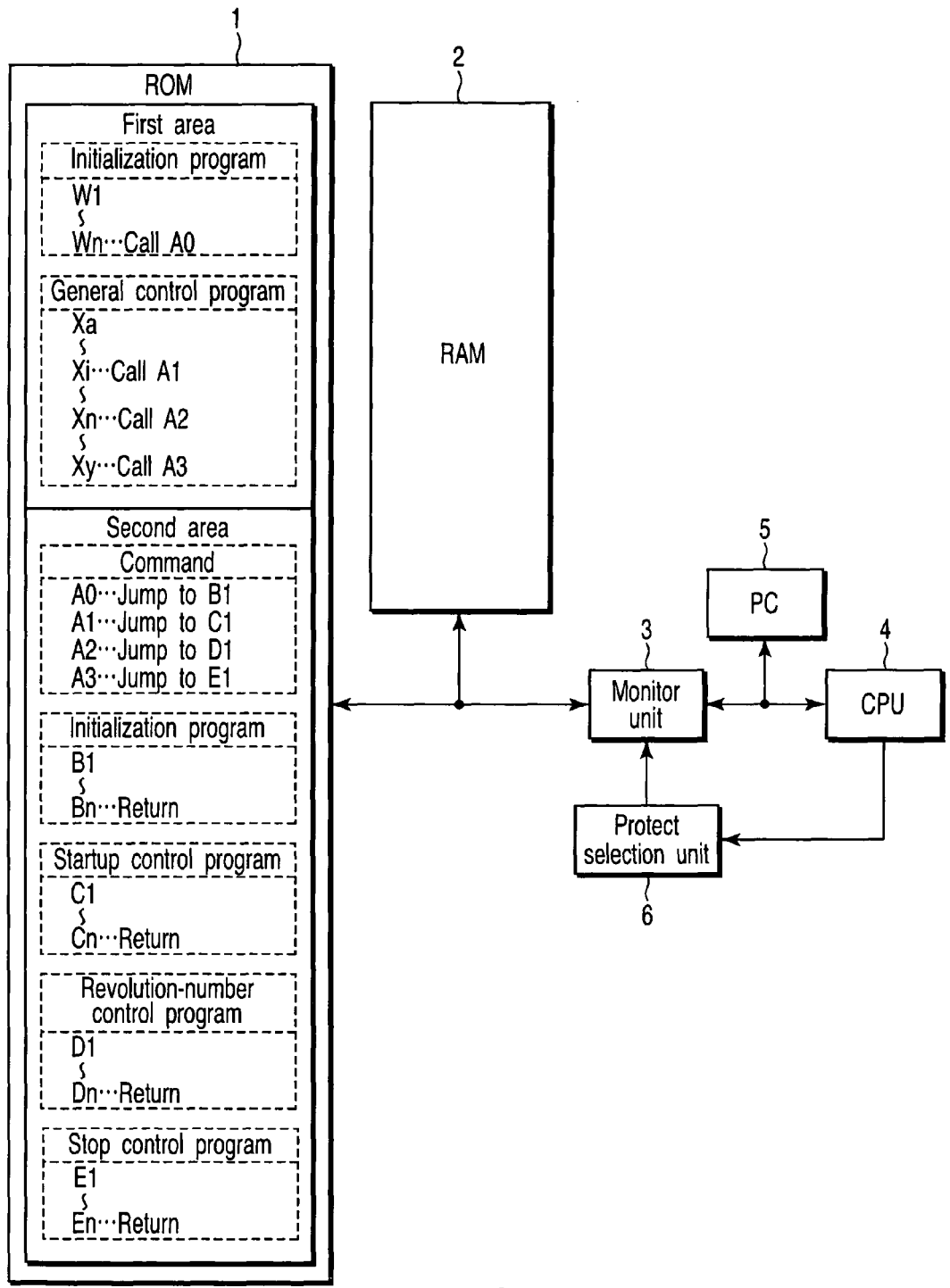
FIG. 2 is a block diagram showing a configuration of a microcomputer according to the embodiment of the present invention.

FIG. 2 schematically shows the microcomputer 100. The microcomputer includes a read only memory (ROM) 1 serving as a storage unit. The ROM 1 is divided into a plurality of storage areas, such as a first area and a second area.

The first area stores an initialization program and a general control program. The initialization program includes data and commands stored in addresses W1 to Wn. When the air conditioner turns on, the initialization program starts up and initializes all the addresses in the first area to inhibit data from being read out in response to access from the second area. The commands include a call command for a specific address A0 in the second area. The general control program is used to generally perform various control operations of the air conditioner and includes data and commands stored in addresses Xa to Xy. When the air conditioner turns on, the general control program starts up to determine and perform the entire control operation of the air conditioner loaded with the microcomputer. The commands stored in the addresses Xa to Xy include call commands for specific addresses A1, A2 and A3 in the second area.

The second area stores commands, an initialization program, and a plurality of subroutine programs for individually controlling the functions of the compressor motor 109 of the air conditioner in accordance with the general control program. The subroutine programs include a startup control program, a revolution-number control program and a stop control program. The commands of the second area include jump commands to an initial address B1 of the initialization program, an initial address C1 of the startup control program, an initial address D1 of the revolution-number control program and an initial address E1 of the stop control program. These jump commands are stored in the specific addresses A0, A1, A2 and A3 of the second area. The initialization program of the second area includes data and commands stored in addresses B1 to Bn. If the initialization program of the first area calls the address A0 to designate the address B1, the initialization program of the second area starts up and initializes all the addresses of the second area to inhibit data from being read out in response to access from the first area.

The startup control program controls the startup of the compressor motor 109 and is stored in addresses C1 to Cn. A return command for the address of the general control program that has called the startup control program is stored in the last address Cn.

The revolution-number control program controls the number of revolutions F of the compressor motor 109 and is stored in addresses D1 to Dn. A return command for the general control program is stored in the last address Dn.

The stop control program controls the stop of the compressor motor 109 and is stored in addresses E1 to En. A return command for the general control program is stored in the last address En.

The microcomputer includes a random access memory (RAM) 2 used for storing data temporarily. A CPU 4 is connected to the ROM 1 and RAM 2 via a monitor unit 3. A program counter 5 and a protect selection unit 6 are each connected to the monitor unit 3 and CPU 4.

The monitor unit 3 monitors and manages whether data is allowed to be read or inhibited from being read in response to access between the first and second areas in the ROM 1. The protect selection unit 6 selects whether the inhibition of read of data in response to access between the first and second areas is valid or invalid through the monitor unit 3 in accordance with a command from the CPU 4.

An operation of the microcomputer described above will be described.

When the air conditioner turns on, the initialization program of the first area in the ROM 1 starts up first. The startup initialization program initializes all the addresses of the first area to inhibit data from being read out in response to access from the second area, and calls the specific address A0 of the second area. A command "Jump to B1" is stored in the called specific address A0. Based on this command, the initialization program stored in the addresses B1 to Bn of the second area starts up. This initialization program initializes all the addresses of the second area to inhibit data from being read out in response to access from the first area.

Then, the general control program of the first area in the ROM 1 starts up. The general control program calls the specific addresses A1 to A3 of the second area during the process, and designates the initialization program, startup control program, revolution-number control program and stop control program in the second area through the jump commands stored in the specific addresses A1 to A3.

When an address Xi of the general control program is designated (when the compressor motor needs to start up), a command "Jump to C1" stored in the address A1 of the second area is designated based on a command "Call A1" of the designated address Xi. Based on the command "Jump to C1," the startup control program stored in the addresses C1 to Cn of the second area starts up to control the startup of the compressor motor. A return command is stored in the last address Cn of the startup control program. Based on the return command, an address Xi+1 of the general control program in the first area is designated, and a process starts from the address Xi+1.

When the address Xi of the general control program is designated, it is stored in the RAM 2. In response to the return command, the process automatically shifts to the address Xi+1, which is obtained by adding "1" to the address Xi in the RAM 2.

Figure 3:
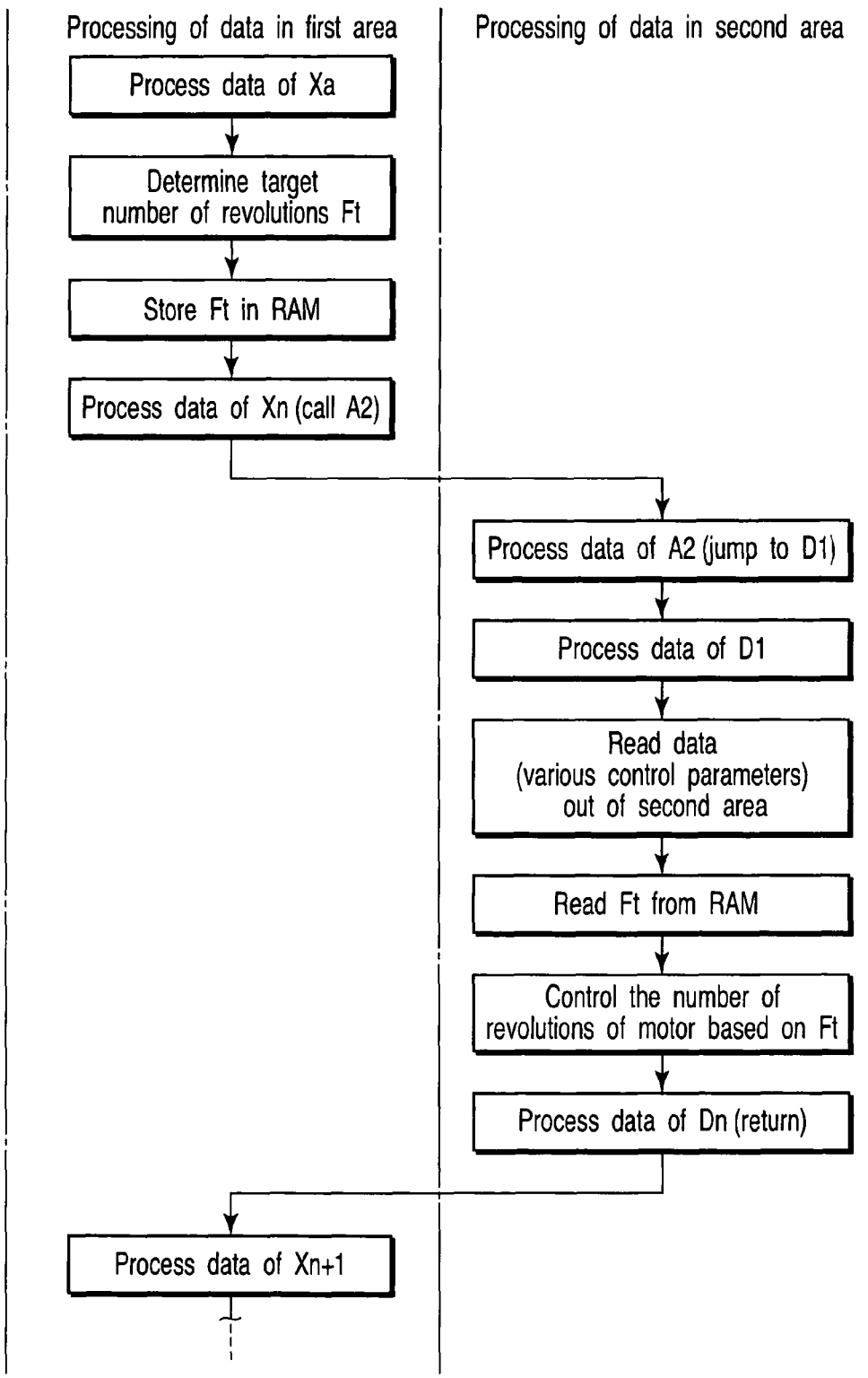
FIG. 3 is a chart showing a process of data processing according to the embodiment of the present invention.

When an address Xn of the general control program is designated (when the number of revolutions of the compressor motor needs to be controlled), a command "Jump to D1" stored in the address A2 of the second area is designated based on a command "Call A2" of the designated address Xn. A process of data processing on the revolution-number control program is shown in FIG. 3. Based on the jump command of the address A2, the revolution-number control program stored in the addresses D1 to Dn of the second area starts up to control the number of revolutions F of the compressor motor. In this case, the target number of revolutions Ft is stored in a given address of the RAM 2, and the compressor motor is driven such that the number of revolutions F reaches the target number of revolutions Ft. A return command is stored in the last address Dn of the revolution-number control program. Based on the return command, a process starts from the address Xn+1 of the general control program in the first area.

In data processing, various parameters are read out of the second area in the ROM 1 and used one by one for control. This readout is a process based on the command in the same second area and is not performed from another area. Therefore, even though inhibition in reading data in response to access from the first area is set at the time of initialization, this initialization is invalid.

When the process of the general control program advances and the address Xy is designated (when the compressor motor needs to stop), a command "Jump to E1" stored in the address A3 of the second area is designated in response to a command "Call A3" of the designated address Xy. Based on this jump command, the stop control program stored in the addresses E1 to En of the second area starts up to control the stop of the compressor motor 109. A return command is stored in the last address En of the stop control program. Based on the return command, a process starts from the address Xy+1 of the general control program in the first area.

Since data is inhibited from being read out of all the addresses in the first area of the ROM 1 in response to access from the second area, the contents of the first area cannot be read out by the programs of the second area. The confidentiality of the programs of the first area is protected from the programmer of the second area. Similarly, since data is inhibited from being read out of the second area in response to access from the first area of the ROM 1, the contents of the second area cannot be read out by the programs of the first area of the ROM 1. The confidentiality of the programs in the second area is protected from the programmer of the first area. The confidentiality of the programs stored in the ROM 1 can be achieved within the microcomputer.

In creating the initialization program, start startup control program, revolution-number control program and stop control program, the initial addresses B1, C1, D1 and E1 of these programs may be changed. The changed initial addresses are updated to addresses to which the jump commands of specific addresses A0, A1, A2 and A3 jump by the programmer of the second area. Consequently, the programmer of the first area need not take into consideration the change in the initial addresses of the control programs and has only to understand only the specific addresses A0, A1, A2 and A3 that are to be called.

In creating the programs of the first and second areas in the ROM 1, the programmers in these areas need not contact each other. In other words, the programmer in the first area can concentrate on creating the programs of the first area without participating in creating the programs of the second area, while the programmer in the second area can concentrate on creating the programs of the second area without participating in creating the programs of the first area. Hence, the programmers can greatly be relieved from heavy burdens of creating the programs and thus properly and quickly create the programs without errors, thereby improving in reliability of control.

If an inhibition release command is set at the time of initialization, the CPU 4 sends it to the protect selection unit 6. The protect selection unit 6 operates the monitor unit 3 to invalidate the inhibition in reading data from each of the first and second areas.

The above inhibition release command can be set only by the programmer of each of the areas and cannot be set intentionally by the programmer of one of the areas in the ROM 1 through a man-made operation of the programmer of the other area. The confidentiality of the programs stored in the ROM 1 can thus be protected with reliability. When a program for reading the contents of all the programs out of the second area is stored in the first area, if access for reading is gained to the second area, the programs of the first area stop and the subsequent operations are not performed, with the result that the contents of the programs cannot be read out of the second area.

When a single programmer uses all the areas, the programs thereof need not be protected confidentially. If the inhibition in reading data out of all the areas in the ROM 1 is set in a release position, the areas can be used without limitation, and the ROM 1 can be handled in the same manner as a normal ROM having a single area. The microcomputer can thus be made versatile.

The above embodiment has been described, taking a microcomputer loaded into an air conditioner as an example. However, the embodiment can be applied to a microcomputer loaded into another electrical device. The ROM 1 is divided into two areas; however, it can be divided into three areas. In a microcomputer capable of setting a data read inhibition only in a specific area, too, the confidentiality of programs stored in at least the specific area can be protected.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A microcomputer for an electrical device comprising:
a ROM including at least a first area and a second area, wherein the first area includes a plurality of addresses and the second area includes a plurality of addresses;

a monitor unit which monitors and manages whether data is allowed to be read or inhibited from being read in response to access between the first and second areas in the ROM, wherein a first initialization program stored in the first area is configured to start when the electrical device turns on, and is further configured to initialize all the addresses of the first area to inhibit data from being read out of all the addresses in the first area in response to access from the second area so that content in the first area cannot be read out by second area and the first initialization program is further configured to call the second area;

wherein a second initialization program stored in the second area is configured start in response to the call, and the second initialization program is configured to initialize all the addresses of the second area to inhibit data from being read out of all the addresses in the second area in response to access the first area so that content in the second area cannot be read out by the first area; and wherein at least one program is stored in said another one of the storage areas, a jump command to the stored program in the second area is stored in a specific address of said another one of the storage areas, and a call command for the call and the specific address is stored in the one of the storage areas such that a portion of the stored program in the second area is executed after the jump command is called by the command call, wherein the contents of the stored program in the second area are not read out by the one of the storage areas.

2. The microcomputer according to claim 1, wherein the second area stores the jump command, the second initialization program, and a plurality of control programs;

the first area stores the first initialization program, a general control program, and the call command;

the general control program determines and performs an entire control operation of, the electrical device; and the jump command includes a jump command to an initial address of the second initialization program and a jump command to an initial address of each of the control programs.

3. The microcomputer according to claim 1, wherein the first area stores the first initialization program, a general control program, and the call command;

the second area stores the jump command, the second initialization program, a startup control program of a motor of the electrical device, a revolution-number control program of the motor, and a stop control program of the motor;

the general control program determines and performs an entire control operation of, the electrical device;

the jump command includes a jump command to an initial address of the second initialization program, a jump command to an initial address of the startup control program of the motor, a jump command to an initial address of the revolution-number control program of the motor, and a jump command to an initial address of the stop control program of the motor;

the startup control program of the motor controls startup of the motor;

the revolution-number control program of the motor controls the number of revolutions of the motor; and the stop control program of the motor controls stop of the motor.

4. A method of managing a microcomputer for an electrical device including a ROM which includes at least a first area and a second area, wherein the first area includes a plurality of addresses and the second area includes a plurality of addresses, the microcomputer further including a monitor unit which monitors and manages whether data is allowed to be read or inhibited from being read in response to access between the first and second areas in the ROM, the method comprising:

starting a first initialization program when the electrical device turns on, wherein the first initialization program is stored in the first area and initializes all the addresses of the first area to inhibit data from being read out of all the addresses in the first area in response to access from the second area so that content in first area cannot be read out by the second area, the first initialization program further calls the second area; and starting a second initialization program in response to the call, wherein the second initialization program is stored in the second area and initializes all the addresses of the second area to inhibit data from being read out of all the addresses in the second area in response to access from the first area so that content in the second area cannot be read out by the first area;

storing at least one program in said another one of the storage areas;

storing a jump command to the stored program in a specific address of said another one of the storage areas; and storing a call command for the specific address in the one of the storage areas, wherein a portion of the stored program is executed after the jump command is called by the command call, and wherein the contents of the stored program are not read out by the one of the storage areas.

5. A microcomputer for an air conditioner comprising:

a ROM including at least a first area and a second area, wherein the first area includes a plurality of addresses and the second area includes a plurality of addresses; and a monitor unit which monitors and manages whether data is allowed to be read or inhibited from being read in response to access between the first and second areas in the ROM;

wherein a first initialization program stored in the first area is configured to start up when the air conditioner turns on, and is further configured to initialize all the addresses of the one of the storage areas to inhibit data from being read out of all the addresses in the first area in response to access from the second area so that content in the first area cannot be read out by the second area and configured to call the second area;

wherein a second initialization program stored in the second area is configured to start up in response to the call, and is configured to initialize all the addresses of the second area to inhibit data from being read out of all the addresses in the second area in response to access from the first area so that content in the second area cannot be read out by the first area, wherein at least one control program about the motor of the air conditioner is stored in the second area, a jump command to the stored control program is stored in a specific address of the second area, and a call command for the call and the specific address is stored in the first area such that a portion of the stored control program is executed after the jump command is called by the command call, wherein the contents of the stored control program are not read out by the first area.

6. The microcomputer according to claim 5, wherein the first area stores the first initialization program, a general control program, and the call command;

the second area stores the jump command, the second initialization program, a startup control program of a motor of the air conditioner, a revolution-number control program of the motor, and a stop control program of the motor;

the general control program determines and performs an entire control operation of the air conditioner;

the jump command includes a jump command to an initial address of the second initialization program, a jump command to an initial address of the startup control program of the motor, a jump command to an initial address of the revolution-number control program of the motor, and a jump command to an initial address of the stop control program of the motor;

the motor startup control program of the motor controls startup of the motor;

the revolution-number control program of the motor controls the number of revolutions of the motor; and the stop control program of the motor controls stop of the motor.

* * * * *